US010727695B2

(12) United States Patent
Larsson et al.

(10) Patent No.: US 10,727,695 B2
(45) Date of Patent: Jul. 28, 2020

(54) INDUCTIVE CHARGING MODULE

(71) Applicant: Apple Inc., Cupertino, CA (US)

(72) Inventors: Karl Ruben Fredrik Larsson, Los Altos, CA (US); Christopher S. Graham, San Francisco, CA (US)

(73) Assignee: Apple Inc., Cupertino, CA (US)

(*) Notice: Subject to any disclaimer, the term of this patent is extended or adjusted under 35 U.S.C. 154(b) by 141 days.

(21) Appl. No.: 16/127,898

(22) Filed: Sep. 11, 2018

(65) Prior Publication Data

US 2020/0083745 A1    Mar. 12, 2020

(51) Int. Cl.
*H01M 10/46* (2006.01)
*H02J 50/10* (2016.01)
*G06F 1/18* (2006.01)
*H02J 7/02* (2016.01)

(52) U.S. Cl.
CPC .............. *H02J 50/10* (2016.02); *G06F 1/181* (2013.01); *H02J 7/025* (2013.01)

(58) Field of Classification Search
CPC .......... H02J 7/0042; H02J 7/355; H02J 5/005; H02J 7/025; H02J 50/10
USPC .................................. 320/107, 108, 114, 115
See application file for complete search history.

(56) References Cited

U.S. PATENT DOCUMENTS

| 8,234,509 | B2* | 7/2012 | Gioscia | G06F 1/1632 |
| | | | | 713/300 |
| 2015/0194833 | A1* | 7/2015 | Fathollahi | H02J 7/342 |
| | | | | 320/114 |
| 2015/0311740 | A1 | 10/2015 | Hilario et al. | |
| 2015/0326055 | A1* | 11/2015 | Koyanagi | H02J 7/0042 |
| | | | | 455/573 |
| 2016/0301241 | A1* | 10/2016 | Cho | H02J 7/0042 |
| 2018/0090974 | A1 | 3/2018 | Elkayam et al. | |
| 2018/0279517 | A1* | 9/2018 | Jang | H01Q 1/243 |
| 2019/0326049 | A1* | 10/2019 | Nishimura | H01F 27/30 |

* cited by examiner

*Primary Examiner* — Edward Tso
(74) *Attorney, Agent, or Firm* — Kilpatrick Townsend & Stockton LLP

(57) ABSTRACT

This disclosure describes a portable electronic device that includes an inductive charging receiver for receiving power wireless from a charging device. The portable electronic device includes a device housing including a wall having a channel formed in an interior-facing surface of the wall. The portable electronic device also includes an inductive coil assembly for receiving power wirelessly that is coupled to the interior facing surface. The inductive coil assembly is a flat coil that includes concentric loops of electrically conductive material that define a central opening. A first electrical lead extends away from a peripheral portion of the flat coil and a second electrical lead extends from the central opening, into the channel formed in the back wall and beneath one side of the concentric loops.

18 Claims, 10 Drawing Sheets

INDUCTIVE CHARGING MODULE

FIELD

The described embodiments relate generally to wireless charging. More particularly, the present embodiments are directed towards configuring an inductive charging module in a portable electronic device.

BACKGROUND

Portable electronic devices (e.g., mobile phones, media players, electronic watches, battery cases and the like) operate when there is charge stored in their batteries. Some portable electronic devices include a rechargeable battery that can be recharged by coupling the portable electronic device to a power source through a physical connection, such as through a charging cord. Using a charging cord to charge a battery in a portable electronic device, however, requires the portable electronic device to be physically tethered to a power outlet. To avoid such shortcomings, wireless charging devices and modules have been developed to wirelessly charge portable electronic devices without the need for a charging cord. For example, some portable electronic devices can be recharged by merely resting the device on a charging surface of a wireless charging device. A transmitter coil disposed below the charging surface may produce a time-varying magnetic flux that induces a current in a corresponding receiving coil in the portable electronic device. Unfortunately, the receiving coil can take up space within the portable electronic device that can make the device more bulky and/or reduce space for other components. Consequently, ways of reducing the amount of space taken up by the receiving coil is desirable.

SUMMARY

This disclosure describes various embodiments that relate to configurations of an inductive charging receiver coil and its incorporation within a portable electronic device.

A portable electronic device is disclosed and includes the following: a device housing including a wall having a channel formed in an interior-facing surface of the wall; and an inductive coil assembly coupled to the interior facing surface. The inductive coil assembly includes concentric loops of electrically conductive material that define a central opening; a first electrical lead extending away from a peripheral portion of the inductive coil assembly; and a second electrical lead extending from the central opening, into the channel defined by the wall and beneath one side of the concentric loops.

A case for a portable electronic device is disclosed and includes the following: a battery; a case housing defining a first cavity configured to receive the portable electronic device and a second cavity accommodating the battery, the case housing comprising a wall having a channel formed in an interior-facing surface of the wall; an inductive coil assembly coupled to the interior-facing surface and configured to receive electrical energy. The inductive coil assembly includes a first electrical lead extending away from a peripheral portion of the inductive coil assembly; and a second electrical lead extending from a central region of the inductive coil assembly, into the channel defined by the wall and beneath one portion of the inductive coil assembly, the first and second electrical leads being configured to transmit electrical current induced within the inductive coil assembly to the battery.

Another portable electronic device is disclosed and includes the following: a device housing including a back wall having a channel formed in an interior-facing surface of the back wall; a battery disposed within the device housing; and an inductive coil assembly coupled to the interior facing surface and positioned between the battery and the back wall. The inductive coil assembly includes the following: a first electrical lead extending away from a peripheral portion of the inductive coil assembly; and a second electrical lead extending from a central region of the inductive coil assembly, into the channel defined by the back wall and beneath one portion of the inductive coil assembly. The first and second electrical leads are configured to transmit electrical current induced within the inductive coil assembly to the battery.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
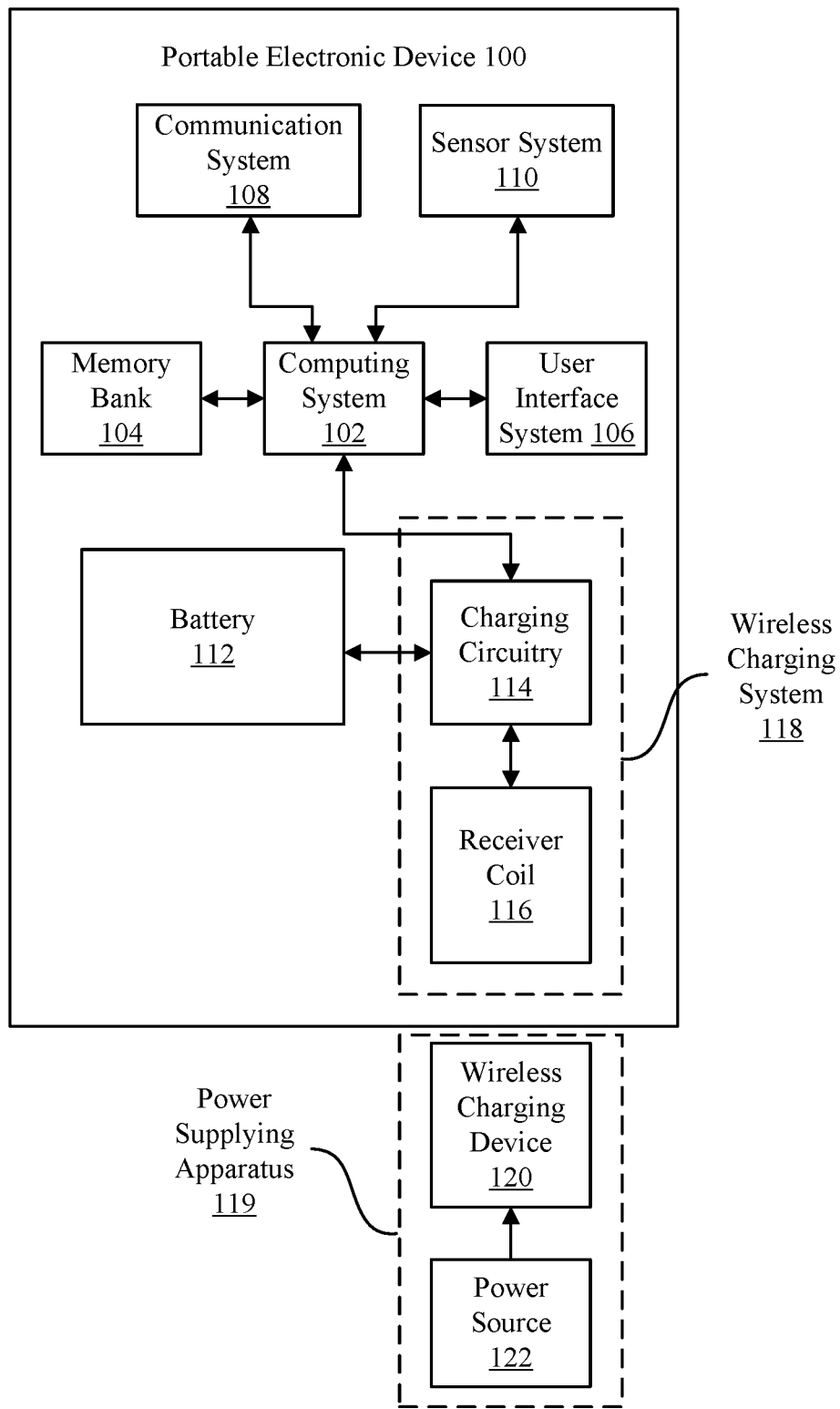
FIG. 1 is a block diagram illustrating an exemplary portable electronic device, an exemplary power supplying apparatus for coupling with the exemplary portable electronic device to charge the exemplary portable electronic device.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

A portable electronic devices is an electronic device that can operate without being coupled to a power grid by running on its own using locally stored electrical power. The portable electronic device can be specifically designed to perform various functions for a user. In some embodiments, an accessory device can include an auxiliary battery for extending the useful operating time of the portable electronic device. In order to also provide robust protection of the portable electronic device the accessory device can surround most exterior surfaces of the portable electronic device and in some instances make access to ports difficult. For this reason, it can be desirable to include a wireless energy receiving coil in an accessory device for ease of charging; however, adding additional circuitry to the accessory device may reduce an amount of space available for battery volume, or can unduly increase the size of the accessory device.

One way to add wireless charging to the accessory device without unduly reducing space available for the battery or other components is to partially embed the wireless energy receiving coil into a wall of the accessory device. In this way, an amount of space taken up within the accessory device can be reduced. Other efficiencies can be achieved by forming the wireless energy receiving coil as a flat coil formed from stranded wires making for an overall thickness of less than 250 microns.

In some embodiments, the wireless energy receiving coil can be part of an inductive charging coil assembly that includes a shield for reducing capacitive noise generated during a wireless charging operation. The shield can include tabs with termination contacts for grounding the shield to an electrically conductive heat-spreading layer positioned above the inductive charging coil assembly.

These and other embodiments are discussed below with reference to FIGS. 1-7; however, those skilled in the art will readily appreciate that the detailed description given herein with respect to these figures is for explanatory purposes only and should not be construed as limiting.

FIG. 1 is a block diagram illustrating an exemplary portable electronic device 100, an exemplary power supplying apparatus 119 for coupling with device 100 to charge device 100, according to some embodiments of the present disclosure. Device 100 includes a computing system 102 coupled to a memory bank 104. Computing system 102 can include control circuitry configured to execute instructions stored in memory bank 104 for performing a plurality of functions for operating device 100. The control circuitry can include one or more suitable computing devices, such as microprocessors, computer processing units (CPUs), graphics processing units (GPUs), field programmable gate arrays (FPGAs), and the like.

Computing system 102 can also be coupled to a user interface system 106, a communication system 108, and a sensor system 110 for enabling electronic device 100 to perform one or more functions. For instance, user interface system 106 can include a display, speaker, microphone, actuator for enabling haptic feedback, and one or more input devices such as a button, switch, capacitive screen for enabling the display to be touch sensitive, and the like. Communication system 108 can include wireless telecommunication components, Bluetooth components, and/or wireless fidelity (WiFi) components for enabling device 100 to make phone calls, interact with wireless accessories, and access the Internet. Sensor system 110 can include light sensors, accelerometers, gyroscopes, temperature sensors, and any other type of sensor that can measure a parameter of an external entity and/or environment.

All of these electrical components require a power source to operate. Accordingly, electronic device 100 also includes a battery 112 for discharging stored energy to power the electrical components of device 100. To replenish the energy discharged to power the electrical components, electronic device 100 includes a wireless charging system 118. Wireless charging system 118 can include charging circuitry 114 and receiver/transmitter coil 116 for receiving power from a wireless charging device 120 coupled to an external power source 122. Wireless charging device 120 can include a transmitter coil for generating a time-varying magnetic flux capable of generating a corresponding current in receiver coil 116. The generated current can be utilized by charging circuitry 114 to charge battery 112.

Figure 2:
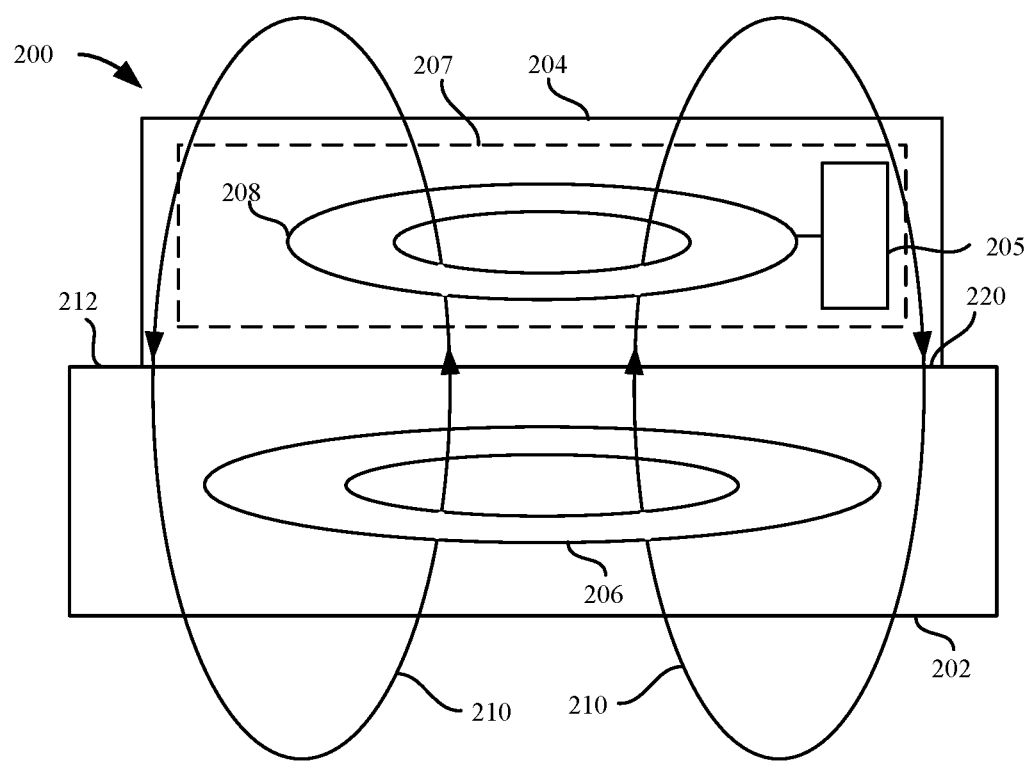
FIG. 2 illustrates an exemplary wireless charging system during wireless power transfer.

FIG. 2 illustrates an exemplary wireless charging system during wireless power transfer. Specifically, FIG. 2 illustrates the electrical interactions experienced by an exemplary wireless charging system as it is receiving power from a wireless charging device. A portable electronic device 204 is positioned on a charging surface 212 of a wireless charging device 202. Portable electronic device 204 can include a wireless charging system 207 that has a receiver/transmitter coil 208 and charging circuitry 205; and wireless charging device 202 can include a transmitter coil 206. Receiver coil 208 can be an inductor coil that can interact with and/or generate time-varying magnetic flux. Electronic device 204 can be a consumer electronic device, such as a smart phone, tablet, battery case and the like. Wireless charging device 202 can be any suitable device configured to generate time-varying magnetic field to induce a corresponding current in a receiving device. For instance, wireless charging device 202 can be a wireless charging mat, puck, docking station, and the like. Electronic device 204 may rest on the wireless charging device 202 at charging surface 212 to enable power transfer.

During wireless power transfer from wireless charging device 202 to portable electronic device 204, wireless charging system 207 can operate to receive power from wireless charging device 202. For instance, charging circuitry 205 can operate receiving coil 208 as a receiving coil to receive power by interacting with time-varying magnetic flux 210 generated by transmitter coil 206. Charging circuitry 205 can correspond with charging circuitry 114 in FIG. 1. Interaction with time-varying magnetic flux 210 results in an inducement of current in hybrid receiver/transmitter coil 208, which can be used by charging circuitry 205 to charge an internal battery of portable electronic device 204. As shown in FIG. 2, portable electronic device 204 can rest on charging surface 212 of wireless charging device 202. In some embodiments, an interface surface 220 of portable electronic device 204 makes contact with charging surface 212 during wireless power transfer. Thus, portable electronic device 204 can receive power through interface surface 220. Interface surface 220 can be an external surface of a housing of portable electronic device 204.

Figure 3A:
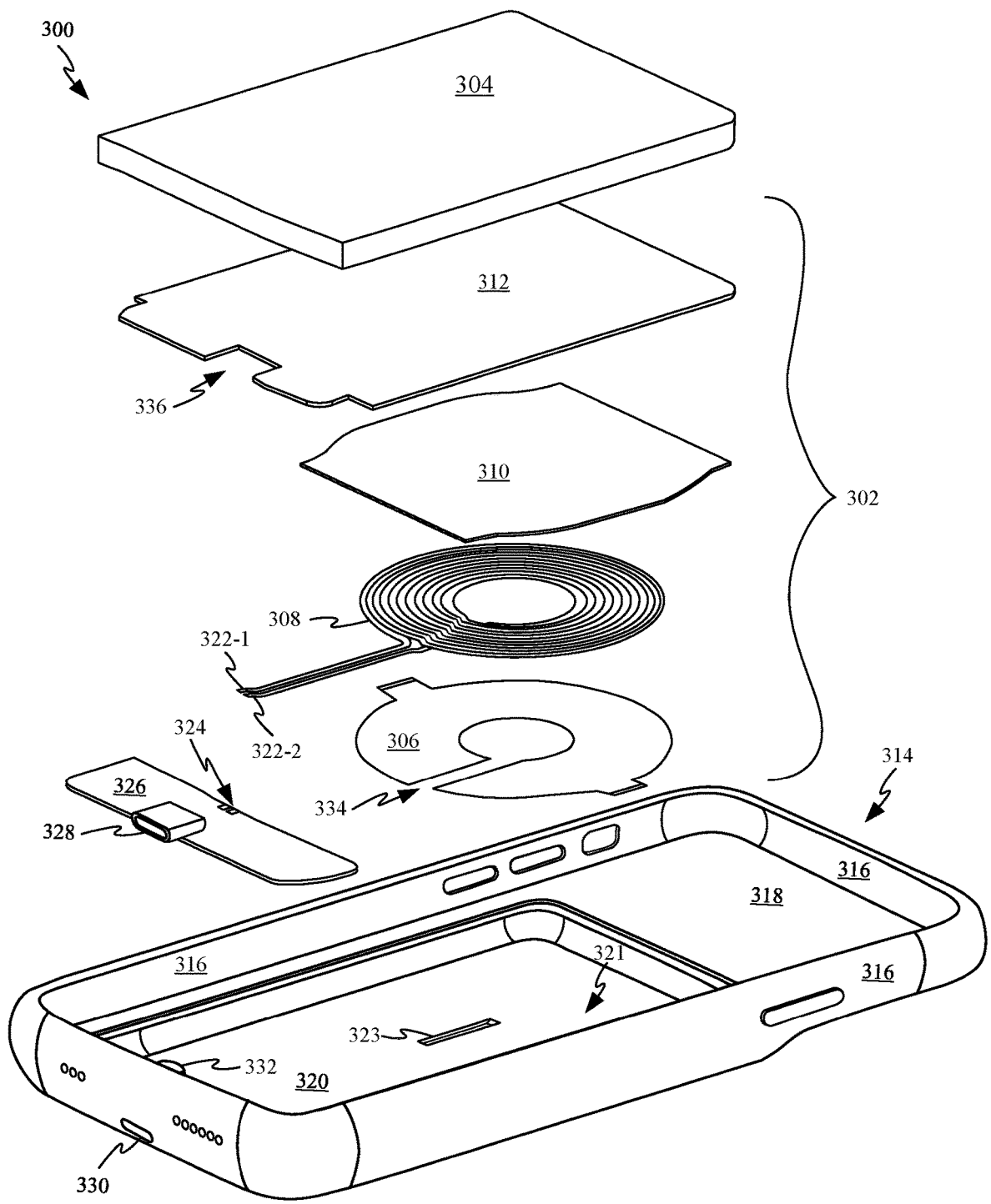
FIG. 3A shows an exploded perspective view of an exemplary portable electronic device taking the form of a battery case that includes a wireless charging assembly for wirelessly receiving electrical energy and an energy storage device.

FIG. 3A shows an exploded perspective view of an exemplary portable electronic device taking the form of battery case 300 that includes a wireless charging assembly 302 for wirelessly receiving electrical energy and an energy storage device such as a capacitor or battery 304. Wireless charging assembly 302 can include E-shield assembly 306, inductive coil assembly 308, base ferrite layer 310, and heat-spreading layer 312. In particular, battery case 300 includes a case housing 314 made up of multiple sidewalls 316 defining a primary cavity 318 and a secondary cavity 320. A portion of secondary cavity 320 can also include a back wall 321 that helps enclose secondary cavity 320. Primary cavity 318 can be configured to receive a portable electronic device along the lines of a cellular phone or media device. Secondary cavity 320 can be configured to receive battery 304 and wireless charging assembly 302. In some embodiments, secondary cavity 306 can be sealed, thereby keeping circuitry of battery case 300 separated from an electronic device disposed within cavity 318.

FIG. 3A also shows how inductive coil assembly 308 can include input and output electrical leads 322 configured to form a circuit through which electrical current generated within inductive coil assembly 308 can flow. In particular, electrical leads 322 can be electrically coupled with contacts 324 on printed circuit board (PCB) 326. In some embodiments, slot or channel 323 can be defined by back wall 321 allowing for one of electrical leads 322 to pass beneath inductive charging assembly 308. While component level detail of PCB 326 is not depicted it should be appreciated that PCB 326 can include a connector that routes power received by PCB 326 to battery 304. PCB 326 can also include plug receptacle 328. Plug receptacle 328 can be aligned with receptacle plug opening 330 and configured to allow battery case 300 to receive power from a cable when a wireless charger is not available or wired power is preferred due for power transfer efficiency reasons. In this way, PCB 326 can be configured to transfer power received either wirelessly or through a cable to battery 304. In some embodiments, PCB 326 can have connectors configured to route power received directly to an electronic device positioned within cavity 318. For example, a connector plug 332, which protrudes into cavity 318 and is configured to engage a plug receptacle of an electronic device disposed within cavity 318, can deliver power to the electronic device directly from battery 304 as well as from wired or wireless power receiving subsystems of battery case 300.

FIG. 3A shows E-shield assembly 306 having a geometry that substantially matches a size and shape of inductive coil assembly 308. E-shield assembly 306 differs in that it includes a slot 334 for accommodating the routing of electrical lead 322-2 beneath the coils making up inductive coil assembly 308. E-shield assembly 306 can be formed from multiple layers that include a thin electrically conductive layer sandwiched between two electrically insulating layers. For example, a bottom layer of E-shield assembly 306 could take the form of a layer of pressure sensitive adhesive (PSA) that acts both to adhere e-shield assembly 306 to back wall 321 of case housing 314 and to electrically insulate the thin conductive layer from the back wall 321 of case housing 314. A top layer of e-shield assembly 306 can be formed from a polymer such as polyethylene terephthalate (PET) in some embodiments and electrically insulate the thin conductive layer from inductive coil assembly 308. In some embodiments, the thin conductive layer can be less than 50 nm thick. In one particular configuration, a thickness of the thin conductive layer can be between 5 and 15 nanometers thick. The thin conductive layer can be deposited upon the PET layer using a PVD process. The thin conductive layer can be configured to operate as a capacitive shield that decouples capacitive noise generated along a downward facing surface of inductive coil assembly 308 during a wireless charging operation. An overall thickness of e-shield assembly 306 can be between 15 and 20 microns.

In some embodiments, inductive coil assembly 308 is depicted as a flat coil and can be formed from wound copper coil encased at least in part by one of a polyurethane or polyimide coating. It should be appreciated that inductive coil assembly 308 could also take the form of a helical coil. In some embodiments, the inductive coil assembly 308 can have an inner diameter of 19 mm and an outer diameter of 47 mm. Base ferrite layer 310 can be made up of multiple layers that include a layer formed of an iron alloy sandwiched between a layer of PET and a layer of pressure sensitive adhesive (PSA). The layer of PSA can be configured to affix base ferrite layer 310 to inductive coil assembly 308 and in some embodiments to a periphery of e-shield assembly 306. Base ferrite layer 310 can be configured to prevent a magnetic field inducing current in inductive coil assembly 308 from penetrating farther into battery case 300. Heat-spreading layer 312 can be configured to spread heat generated during wireless charging across a lower surface of battery 304 to prevent over heating a small region of battery 304 positioned directly above inductive coil assembly 308. In some embodiments, heat=spreading layer 312 can also be configured to receive or transmit heat to printed circuit board (PCB) 326. Heat-spreading layer 312 can also include a notch 336 for accommodating the height of plug receptacle 328, which can be surface mounted to PCB 326. Heat-spreading layer 312 can be adhesively coupled to base ferrite layer 310.

Figure 3B:
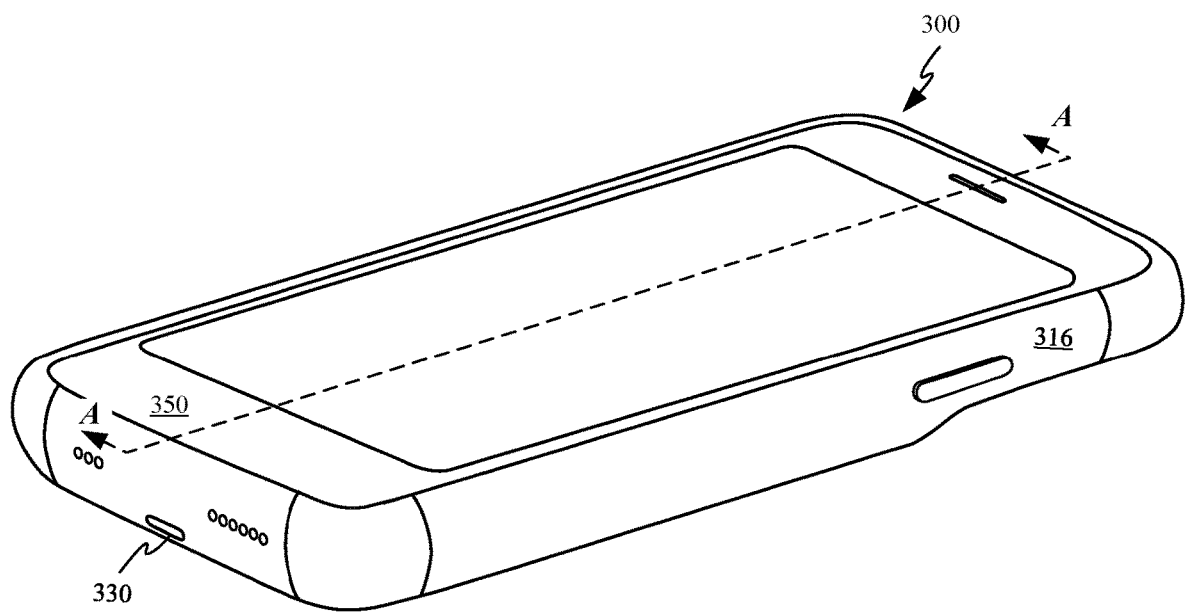
FIG. 3B shows a perspective view of an electronic device disposed within a primary cavity of the battery case depicted in FIG. 3A.

FIG. 3B shows a perspective view of an electronic device 350 disposed within a primary cavity of battery case 300. In some embodiments, a wireless charging assembly similar to wireless charging assembly 302 can be incorporated within electronic device 700. For example, a back wall of electronic device 700 can include a slot or channel for accommodating the routing of one of the electrical leads of an inductive coil assembly beneath concentric loops of the inductive coil assembly. Electronic device 350 includes a data/charging port configured to receive electricity from energy stored within battery case 300 by way of a connector plug 332 (see FIG. 3A). In this way, energy received by battery case 300 through either receptacle plug opening 330 or wireless charging assembly 302 can be routed to a battery within electronic device 350.

Figure 4:
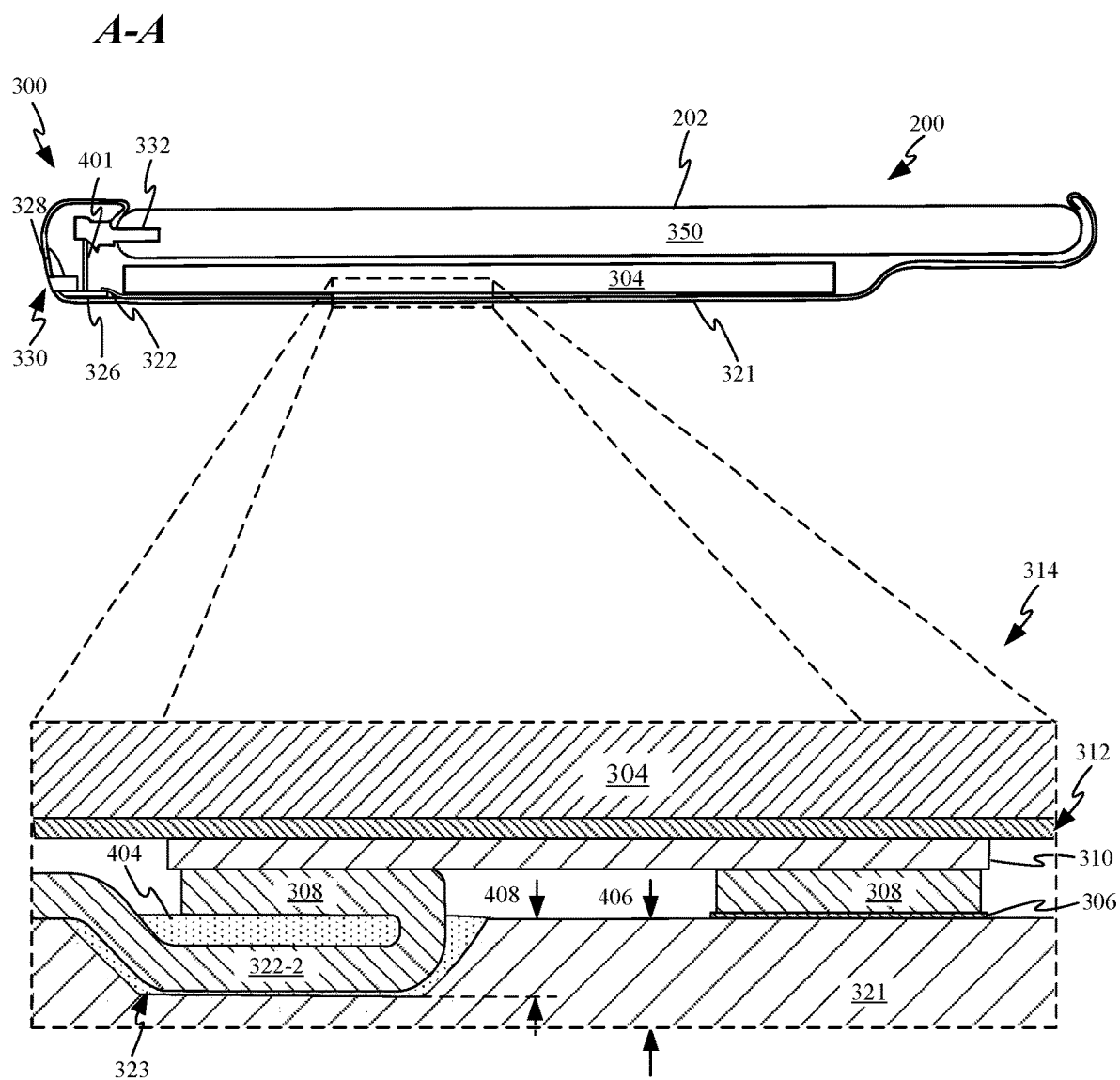
FIG. 4 shows a cross-sectional side view of an electronic device disposed within the battery case depicted in FIGS. 3A-3B in accordance with section line A-A from FIG. 3B.

FIG. 4 shows a cross-sectional side view of electronic device 350 disposed within battery case 300 in accordance with section line A-A from FIG. 3B. In particular, electronic device 350 is depicted as being engaged by and electrically coupled with connector plug 332. Connector plug 332 is in turn electrically coupled with PCB 326 by electrically conductive pathway 401. FIG. 4 also includes a cross-sectional side view of wireless charging assembly 302 positioned upon and partially within back wall 321 and beneath battery 304. A section of electrical lead 322-2 is shown extending beneath one side of inductive coil assembly 308. By embedding the section of electrical lead 322-2 below inductive coil assembly 308 the section of electrical lead 322-2 can be routed out of a central region of inductive coil assembly 308 without increasing the height of inductive coil assembly. Unused portions of slot 323 can be filled by adhesive compound 404 both above and below electrical lead 322-2, thereby preventing a structural integrity of back wall 321 from being compromised. Slot 323 can have a depth that exceeds half or even two thirds of a total thickness of back wall 321. In some embodiments, the total wall thickness 406 of back wall 321 can be about 0.75 mm and a depth 408 of the slot can be about 0.5 mm. Depth 408 of slot 323 allows electrical lead 322-2 to be sufficiently separated from the concentric loops making up inductive coil assembly 308 to prevent or at least ameliorate any cross-talk between the section of electrical lead 322-2 and the concentric loops of inductive coil assembly 308.

While the aforementioned inductive coil assembly is depicted as being incorporated within a battery case it should be appreciated that the inductive coil assembly can be positioned within other types of devices in a similar configuration. For example, a laptop having a radio transparent housing component or radio transparent window could also incorporate an inductive coil assembly where an electrical lead extending from a central region of the inductive coil assembly is embedded within a channel formed by the radio transparent housing component or window. Other exemplary implementations can include incorporation of an inductive charging coil within a supporting foot of a monitor device or all-in-one computing device, where the supporting foot supports the weight of the device above a supporting surface. The inductive charging coil can be incorporated within a horizontal or substantially horizontal surface (i.e. having an incline of less than 5%) of the supporting foot. In some embodiments, it can be desirable to keep a thickness of a portion of the supporting foot defining the horizontal surface minimized for cosmetic or space accommodation reasons. In order to maintain the thickness of the foot a thickness of a charging component incorporated into the horizontal surface can be minimized by embedding one of the leads of the inductive charging coil within a radio transparent wall of the supporting foot. In some embodiments, the inductive charging assembly can be integrated with other inductive charging assemblies to form an inductive charging mat on the horizontal surface of the supporting foot or the laptop device. In some embodiments, the battery case described above could be a case without a battery and simply configured to provide operating power and/or charge a battery of a device disposed within the case.

Figure 5A:
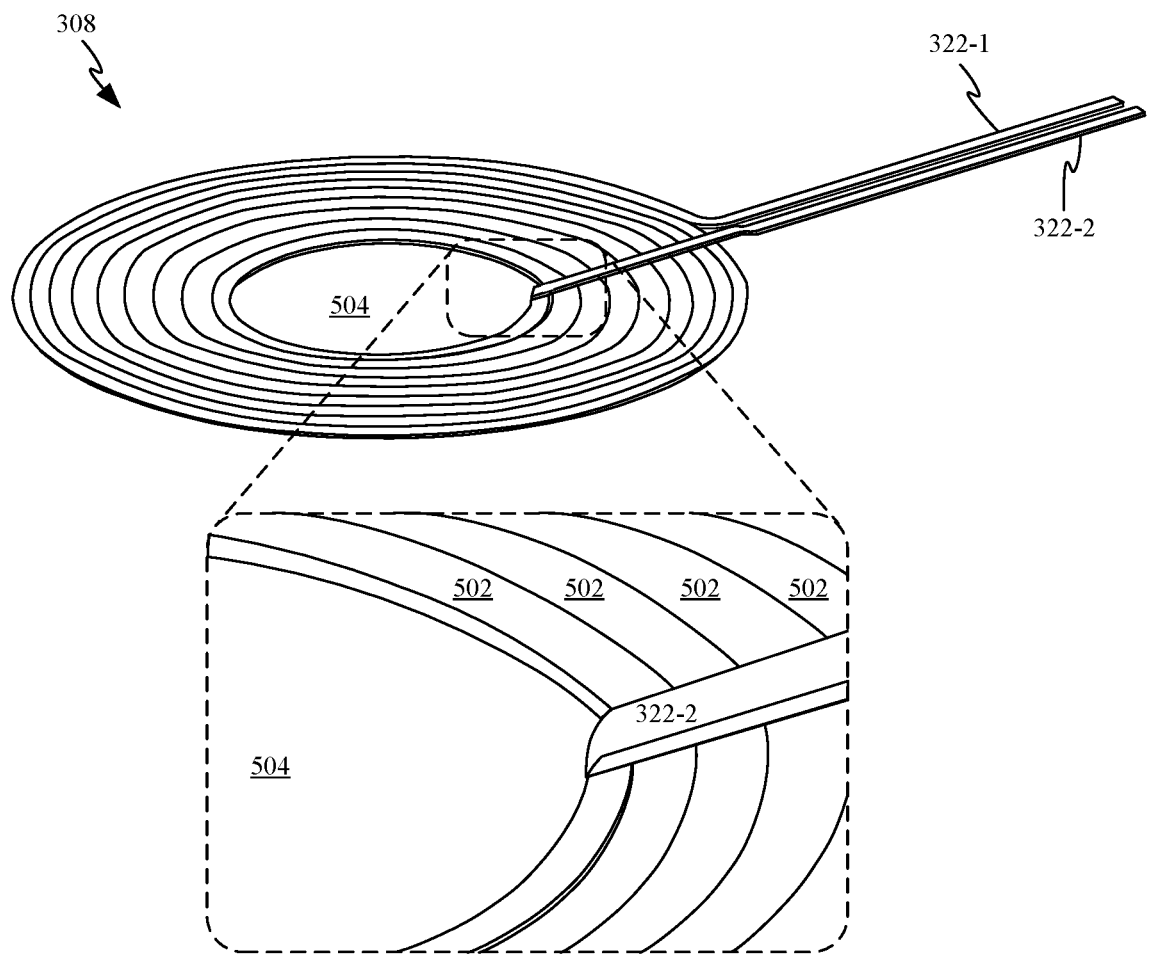
FIG. 5A shows a perspective view of a wall-facing side of an inductive coil assembly.
Figure 5B:
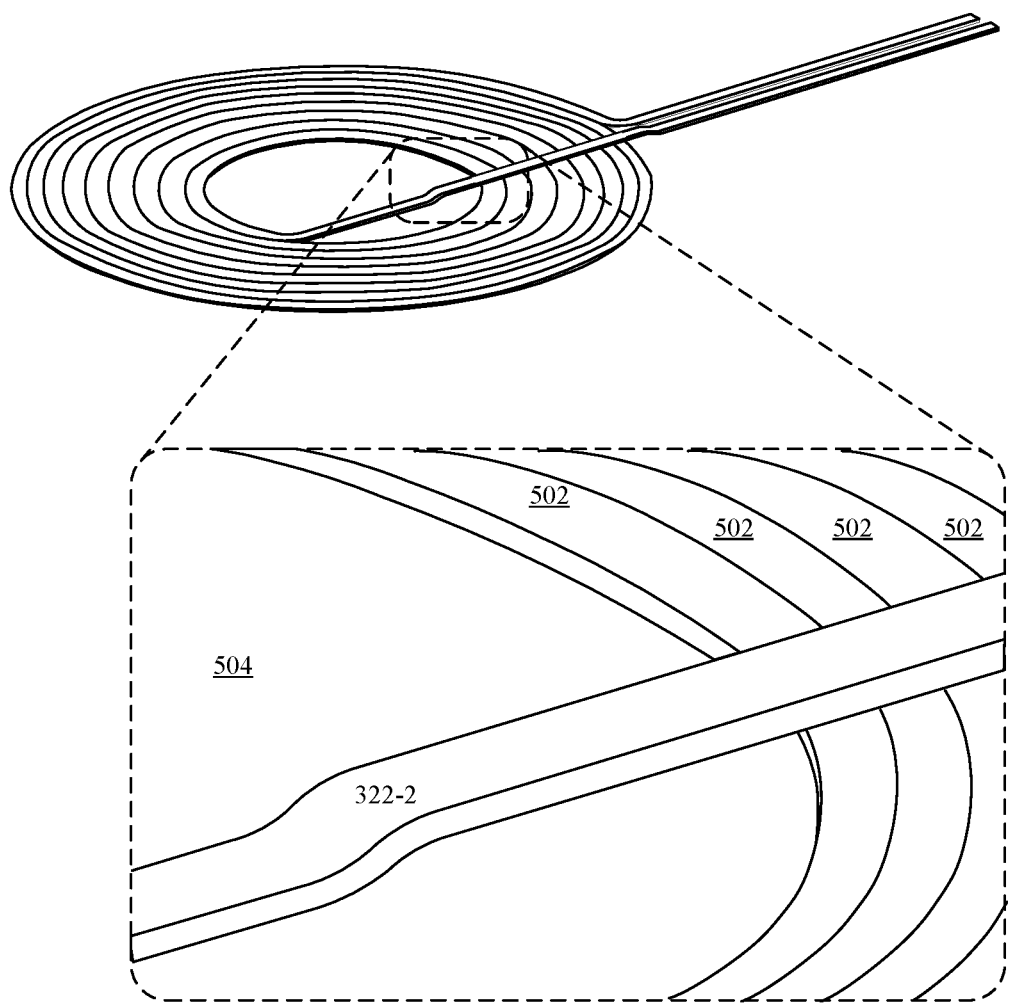
FIG. 5B shows an alternative embodiment in which an electrical lead crosses across a portion of a central opening of the inductive coil assembly.

FIG. 5A shows a perspective view of a wall-facing side of inductive coil assembly 308. Concentric loops 502 making up Inductive coil assembly 308 can have an outer diameter of about 45-50 mm and an inner diameter of about 15-20 mm. In particular, electrical lead 322-2 is shown being folded over and extending from a central opening 502 defined by concentric loops 502 and over the top of multiple concentric loops 502 until reaching a periphery of inductive coil assembly 308. After reaching the periphery, electrical lead 322-2 bends down again so that both of electrical leads 322 are in the same plane as concentric loops 502 of inductive coil assembly 308. FIG. 5B shows a variation in which electrical lead 322-2 crosses across a portion of central opening 504. Routing electrical lead 322-2 across central opening 502 allows a total inductance of inductive coil assembly 308 to be optimized by reducing a total amount of wire required to form an inductive coil of the depicted size on account of electrical lead 322-2. The length of the wires making up inductive coil assembly 308 is reduced due to it not having to extend as far around a periphery of central opening 502.

Figure 5C:
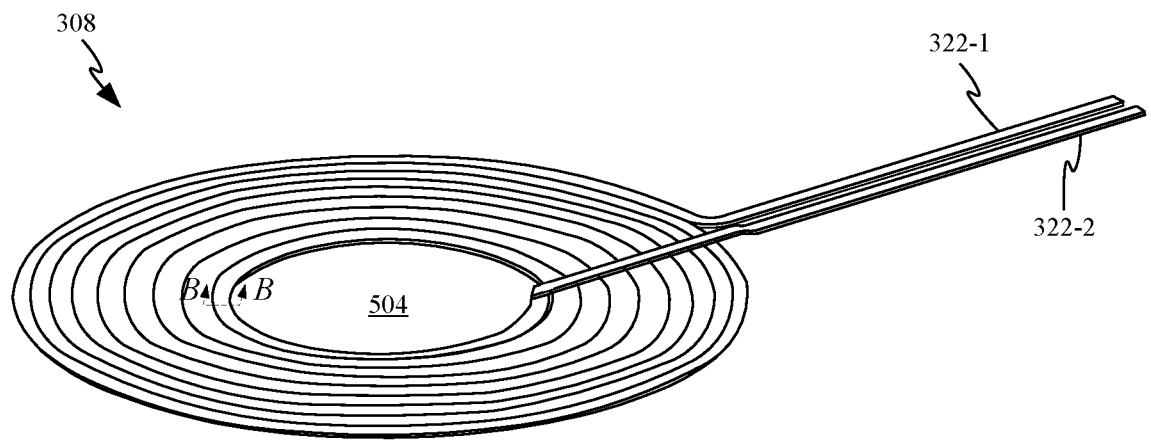
FIG. 5C shows a perspective view of an inductive coil assembly along with a cross-sectional view of a loop of inductive coil assembly 308 in accordance with section line B-B.
Figure 5C:
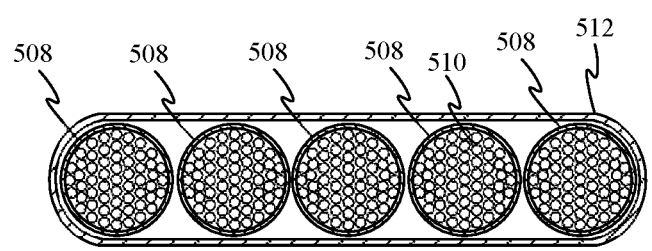

FIG. 5C shows a perspective view of inductive coil assembly 308 along with a cross-sectional view of a loop of inductive coil assembly 308 in accordance with section line B-B. The cross-sectional view shows how each concentric loop 502 can include five parallel stranded wires. Each of stranded wires 508 can have a diameter of about 200 microns and be formed from multiple smaller wires 510 twisted together. In some embodiments, this stranded wire configuration can increase an efficiency with which inductive coil assembly is able to receive energy from a magnetic field generated by a charging device. Stranded wires 508 can be wrapped in a protective layer 512 made of polyurethane and/or polyamide to prevent interaction between the concentric loops making up inductive coil assembly 308. In some embodiments, each individual stranded wire 508 can be wrapped in electrically insulating layers of polyurethane and/or polyamide material. In this way, undesired interaction between adjacent stranded wires 508 can be avoided.

Figure 6A:
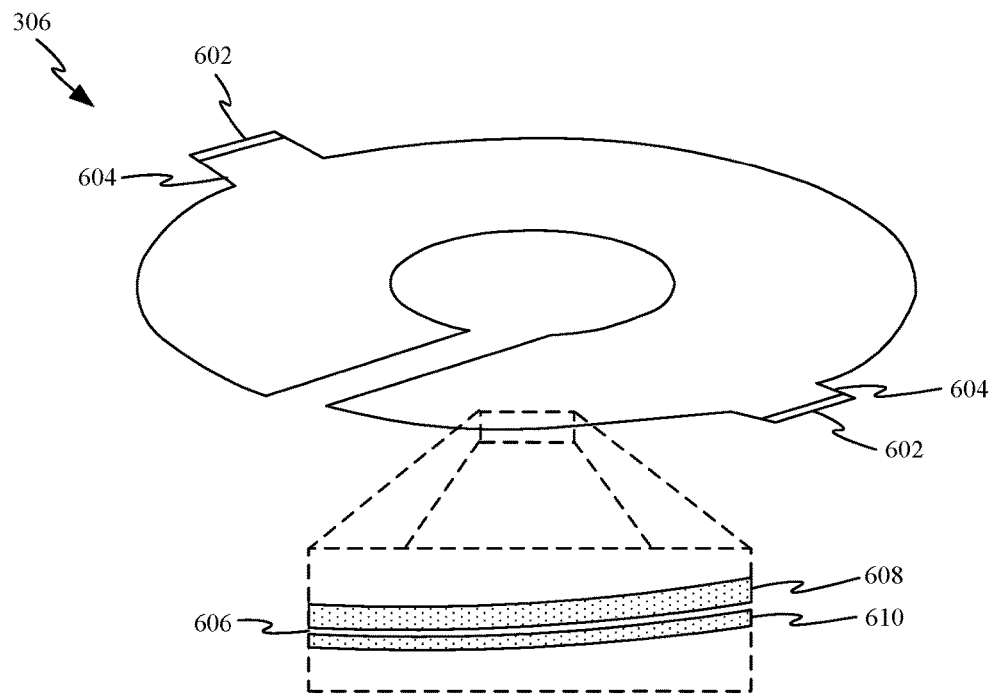
FIG. 6A shows a perspective view of an e-shield assembly.

FIG. 6A shows a perspective view of e-shield assembly 306. E-shield assembly 306 has an annular geometry sized to match a size and shape of inductive coil assembly 308. E-shield assembly 306 includes termination contacts 602 on opposing tabs of e-shield assembly 306. Termination contacts 602 create pathways through which e-shield assembly 306 can be grounded. The close up view of the edge of e-shield assembly 306 shows an electrically conductive layer 606 sandwiched between two electrically insulating layers 608 and 610 forming e-shield assembly 306. In some embodiments, electrically conductive layer 606 can be silver and formed by a physical vapor deposition process. A thickness of electrically conductive layer 606 can be between 5 nm and 15 nm. The use of a thin electrically conductive layer as a capacitive shield can remove capacitive noise from inductive coil assembly 308 without substantially impairing the transfer of charging energy through e-shield assembly 306. Electrically insulating layer 608 can be formed from PET and have a thickness of between 7 and 17 microns. Electrically insulating layer 610 can take the form of a layer of pressure sensitive adhesive and have a thickness of between 3 and 7 microns. The pressure sensitive adhesive can be well suited for attaching e-shield assembly 306 to back wall 321 (not depicted) of case housing 314. In some embodiments, termination contacts 602 can be formed by removing portions of electrically insulating layer 608 to expose portions of electrically conductive layer 606.

Figure 6B:
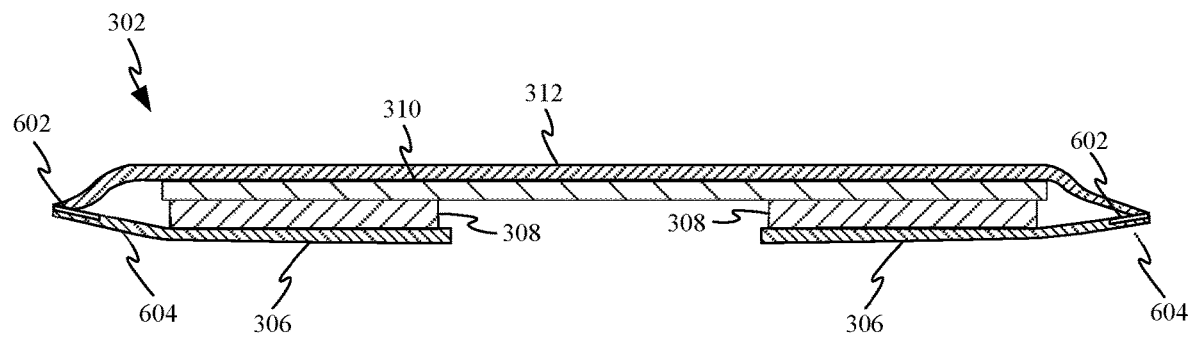
FIG. 6B shows a cross-sectional view of a wireless charging assembly and how termination contacts and tabs of an e-shield assembly can curve upwards to be electrically coupled with portions of an electrically conductive heat-spreading layer.

FIG. 6B shows a cross-sectional view of wireless charging assembly 302 and how termination contacts 602 and tabs 604 of e-shield assembly 306 can curve upwards to be electrically coupled with portions of electrically conductive heat-spreading layer 312. Termination contacts 602 can be secured to heat-spreading layer 312 by copper tape that establishes a secure adhesive coupling and maintains an electrically conductive and thermally conductive pathway between the components. In some embodiments, heat-spreading layer 312 can be formed from pyrolytic graphite sheets (PGS), which can be effective at both dissipating heat and acting as an electrically conductive ground plane for e-shield assembly 306. Heat-spreading layer 312 can have a thickness of about 60 microns sufficient to evenly distribute heat generated by inductive charging assembly 302 to avoid unduly heating localized portions of a battery (not depicted) positioned above heat-spreading layer 312. In some embodiments, peripheral edges of heat-spreading layer 312 can be compressed against tabs 604 by a cowling that maintains positive pressure that cooperates with the copper tape to maintain the peripheral edges of heat-spreading layer 312 in robust thermally and electrically conductive contact with termination contacts 602 of tabs 604.

Figure 7:
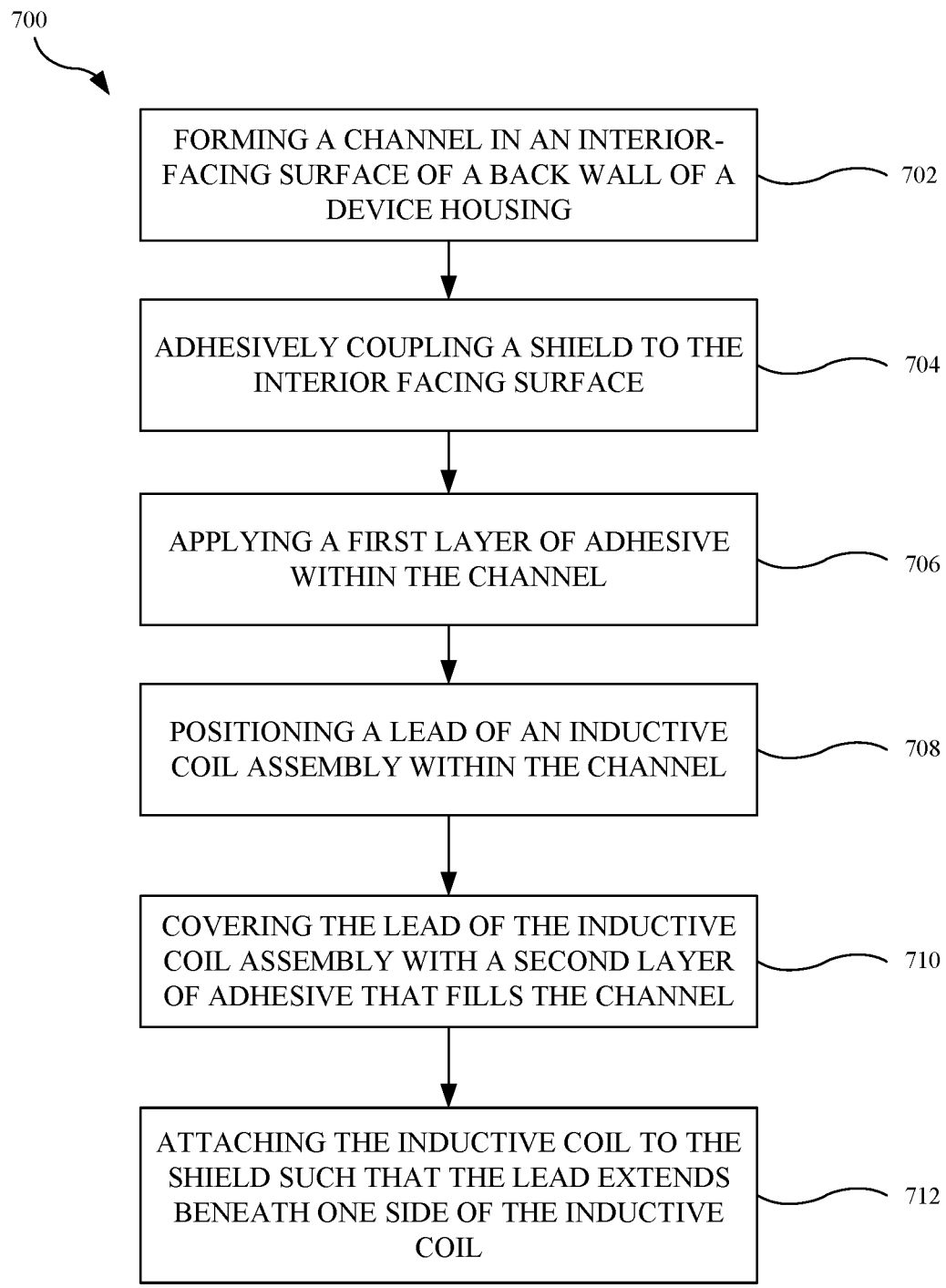
FIG. 7 shows a flow chart describing a method for installing an inductive charging coil within a device housing.

FIG. 7 shows a flow chart 700 describing a method for installing an inductive charging coil within a device housing. At 702, a channel is formed within an interior-facing surface of a back wall of a device housing. In some embodiments, the channel can have a depth of more than half of a thickness of the back wall of the device housing. The channel can be formed by a subtractive machining operation in which material is removed from the back wall of the device housing. In some embodiments, the device housing can be associated with a portable electronic device or a device accessory along the lines of a battery case. At 704, a shield element can be coupled to the interior-facing surface of the back wall. The shield element can define a slot that allows the shield element to be positioned on both sides of the channel while leaving the channel uncovered. At 706, a first layer of adhesive can be added to the channel. At 708, an electrical lead that originates from a central region of an inductive coil assembly can have a portion that is positioned within the channel. The first layer of adhesive within the channel can help keep the electrical lead in place within the channel. At 710, the electrical lead can be covered with a second layer of adhesive. The second layer of adhesive can fill or at least substantially fill the channel. By filling the channel with multiple layers of adhesive and the electrical lead of the inductive coil assembly, a consistency and strength of the back wall of the device housing can be maintained, with a portion of the electrical lead being embedded within the back wall. At 712, the inductive coil can be secured to the shield in a position that results in the embedded portion of the leave being positioned beneath one side of the inductive coil. The second layer of adhesive can help prevent interaction between concentric loops of the inductive coil assembly and the portion of the electrical lead embedded within the back wall. In this way, the inductive coil can lay flat on the interior-facing surface of the back wall with an effective thickness equivalent to a thickness of a single wire used to form the concentric loops making up the inductive coil assembly.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data, which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A portable electronic device, comprising:
    a device housing comprising a wall having a channel formed in an interior-facing surface of the wall;
    an electronic component disposed within the device housing; and
    an inductive coil assembly disposed between the interior-facing surface and the electronic component, the inductive coil assembly comprising: concentric loops of electrically conductive material that define a central opening, a first electrical lead extending away from a peripheral portion of the inductive coil assembly, and a second electrical lead;
    a ferrite sheet disposed between the electronic component and the inductive coil assembly;
    wherein a length of the channel in the interior-facing surface of the wall extends from the central opening to the peripheral portion of the inductive coil assembly and wherein the second electrical lead traverses the inductive coil assembly through the channel.

2. The portable electronic device as recited in claim 1, further comprising an e-shield comprising an electrically conductive material disposed between the concentric loops of the inductive coil assembly and the wall, the e-shield having a slit formed through a portion of the e-shield, wherein the slit is aligned with the channel and the second electrical lead traverses the inductive coil assembly through the slit and the channel.

3. The portable electronic device as recited in claim 1, wherein the electronic component comprises a battery disposed within the device housing, the inductive coil assembly being positioned between the wall and the battery.

4. The portable electronic device as recited in claim 3, further comprising a heat-spreading layer disposed between the inductive coil assembly and the battery.

5. The portable electronic device as recited in claim 4, further comprising a shield disposed between the concentric loops of the inductive coil assembly and the wall, wherein the shield is grounded to the heat-spreading layer.

6. The portable electronic device as recited in claim 5, wherein the shield comprises tabs protruding from opposing sides of the shield that ground the shield to the heat-spreading layer.

7. The portable electronic device as recited in claim 1, further comprising:
    a battery configured to receive electrical energy from the inductive coil assembly.

8. The portable electronic device as recited in claim 1, wherein the portable electronic device is a battery case defining a cavity sized to receive a media device and wherein the portable electronic device includes circuitry for supplying energy to the media device from a battery of the battery case.

9. The portable electronic device as recited in claim 8, further comprising a printed circuit board having a plug connector mounted thereto, wherein the first and second electrical leads are coupled directly to the printed circuit board.

10. A portable electronic device, comprising:
    a device housing comprising a back wall having a channel formed in an interior-facing surface of the back wall;
    a battery disposed within the device housing; and
    an inductive coil assembly disposed between the interior facing surface and the battery, the inductive coil assembly comprising:
        a first electrical lead extending away from a peripheral portion of the inductive coil assembly, and a second electrical lead extending from a central region of the inductive coil assembly, into the channel defined by the back wall and beneath one portion of the inductive coil assembly, the first and second electrical leads being configured to transmit electrical current induced within the inductive coil assembly to the battery; and a ferrite sheet disposed between the batter and the inductive coil assembly;

wherein a length of the channel in the interior-facing surface of the wall extends from the central region to a peripheral portion of the inductive coil assembly and wherein the second electrical lead traverses the inductive coil assembly through the channel.

11. The portable electronic device as recited in claim 10, wherein a portion of the second electrical lead within the channel is embedded within the back wall by filling unused portions of the channel with adhesive material.

12. The portable electronic device as recited in claim 10, wherein the inductive coil assembly comprises a plurality of concentric loops forming a flat coil.

13. The portable electronic device as recited in claim 10, further comprising an e-shield disposed between concentric coils of the inductive coil assembly and the back wall of the device housing, the e-shield comprising an electrically conductive layer having a thickness of less than 50 nm and having a slit formed through a portion of the e-shield, wherein the slit is aligned with the channel and the second electrical lead traverses the inductive coil assembly through the slit and the channel.

14. A case for a portable electronic device, the case comprising:
a battery;
a case housing defining a first cavity configured to receive the portable electronic device and a second cavity accommodating the battery, the case housing comprising a wall having a channel formed in an interior-facing surface of the wall; and an inductive coil assembly coupled to the interior-facing surface and configured to receive electrical energy, the inductive coil assembly comprising:

a first electrical lead extending away from a peripheral portion of the inductive coil assembly; and a second electrical lead extending from a central region of the inductive coil assembly, into the channel defined by the wall and beneath one portion of the inductive coil assembly, the first and second electrical leads being configured to transmit electrical current induced within the inductive coil assembly to a battery.

15. The case as recited in claim 14, further comprising a shield disposed between a portion of the inductive coil assembly and the wall.

16. The case as recited in claim 14, further comprising a rigid printed circuit board (PCB), wherein the first and second electrical leads are wire bonded to the rigid PCB.

17. The case as recited in claim 14, wherein the battery is electrically coupled with the inductive coil assembly and the case further comprises a heat-spreading layer disposed between the inductive coil assembly and the battery.

18. The case as recited in claim 14, wherein the inductive coil assembly further comprises concentric loops of electrically conductive wires defining a central opening at the central region of the inductive coil assembly, and wherein the second electrical lead extends across at least a portion of the central opening.

* * * * *

UNITED STATES PATENT AND TRADEMARK OFFICE
CERTIFICATE OF CORRECTION

PATENT NO. : 10,727,695 B2  
APPLICATION NO. : 16/127898  
DATED : July 28, 2020  
INVENTOR(S) : Karl Ruben Fredrik Larsson and Christopher S. Graham It is certified that error appears in the above-identified patent and that said Letters Patent is hereby corrected as shown below:

In the Claims

Claim 10, Column 11, Line 8, delete the word "batter" and insert the word --battery--

Signed and Sealed this  
First Day of September, 2020

Andrei Iancu  
*Director of the United States Patent and Trademark Office*